United States Patent
Kalmuk et al.

(10) Patent No.: US 7,801,997 B2
(45) Date of Patent: Sep. 21, 2010

(54) ASYNCHRONOUS INTERCONNECT PROTOCOL FOR A CLUSTERED DBMS

(75) Inventors: David Kalmuk, Toronto (CA); Herbert Walter Pereyra, Toronto (CA); Jack Hon Wai Ng, Markham (CA); Cheuk Lun Lam, Markham (CA)

(73) Assignee: International Business Machines Corporation, Armonk, NY (US)

( * ) Notice: Subject to any disclaimer, the term of this patent is extended or adjusted under 35 U.S.C. 154(b) by 913 days.

(21) Appl. No.: 11/278,046

(22) Filed: Mar. 30, 2006

(65) Prior Publication Data
US 2007/0260714 A1 Nov. 8, 2007

(51) Int. Cl.
G06F 15/16 (2006.01)
G06F 15/173 (2006.01)

(52) U.S. Cl. ................................ 709/227; 709/223
(58) Field of Classification Search ........... 709/223, 709/227, 229
See application file for complete search history.

(56) References Cited

U.S. PATENT DOCUMENTS

| | | | |
|---|---|---|---|
| 5,964,886 A | 10/1999 | Slaughter et al. | 714/4 |
| 6,014,669 A | 1/2000 | Slaughter et al. | 707/10 |
| 6,442,713 B1 | 8/2002 | Block et al. | 714/43 |
| 6,742,059 B1* | 5/2004 | Todd et al. | 710/19 |
| 6,748,056 B1* | 6/2004 | Capriotti et al. | 379/88.17 |
| 6,816,510 B1* | 11/2004 | Banerjee | 370/503 |
| 7,079,554 B2* | 7/2006 | Peled | 370/514 |
| 2002/0006826 A1* | 1/2002 | Hansted | 463/42 |
| 2002/0040389 A1* | 4/2002 | Gerba et al. | 709/219 |
| 2002/0161934 A1* | 10/2002 | Johnson et al. | 709/330 |
| 2002/0163932 A1* | 11/2002 | Fischer et al. | 370/465 |
| 2003/0110408 A1* | 6/2003 | Wells et al. | 714/1 |
| 2003/0212784 A1* | 11/2003 | Nguyen | 709/224 |
| 2003/0236888 A1* | 12/2003 | Chauffour et al. | 709/226 |
| 2004/0148397 A1 | 7/2004 | Aronoff et al. | 709/227 |
| 2004/0186832 A1 | 9/2004 | Jardin | 707/3 |
| 2004/0205074 A1 | 10/2004 | Berkery et al. | 707/100 |
| 2004/0240658 A1* | 12/2004 | Delaney et al. | 379/229 |
| 2005/0041692 A1* | 2/2005 | Kallstenius | 370/503 |
| 2005/0047413 A1* | 3/2005 | Ilnicki et al. | 370/392 |
| 2005/0132222 A1* | 6/2005 | Petrovic | 713/201 |
| 2005/0165719 A1* | 7/2005 | Greenspan et al. | 707/1 |
| 2005/0276282 A1* | 12/2005 | Wells et al. | 370/503 |
| 2006/0133309 A1* | 6/2006 | Mathis et al. | 370/328 |
| 2008/0140640 A1* | 6/2008 | Raff | 707/5 |

FOREIGN PATENT DOCUMENTS

KR  2001054861  7/2001

* cited by examiner

Primary Examiner—Firmin Backer
Assistant Examiner—Ebrahim Golabbakhsh
(74) Attorney, Agent, or Firm—Sughrue Mion, PLLC

(57) ABSTRACT

A method, system and computer program product for an asynchronous interconnection between nodes of a clustered database management system (DBMS). Node timestamps are provided when each of the nodes in the cluster are started. Two or more communication conduits are established between the nodes. Each communication conduit between a local node and a remote node has an associated session identifier. The session identifiers and the timestamp from the remote node are associated to each communication conduit and the associated local node in the cluster. A timestamp is received from the remote node at the local node when establishing communication to determine if the remote node corresponds to the remote node incarnation identified by the timestamp and if DBMS communication between nodes can be initiated.

25 Claims, 14 Drawing Sheets

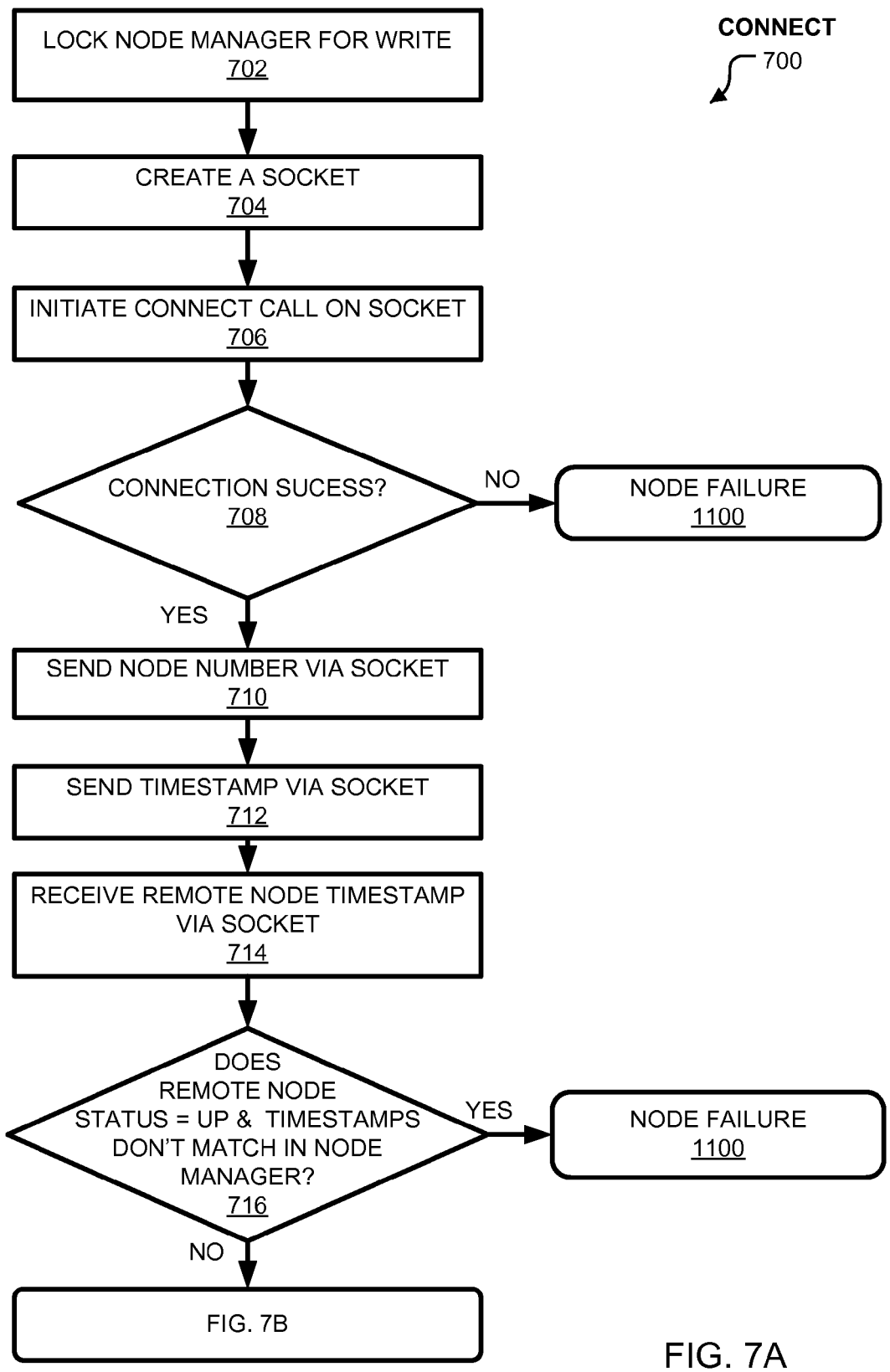

ASYNCHRONOUS INTERCONNECT PROTOCOL FOR A CLUSTERED DBMS

FIELD OF INVENTION

The present invention relates to the field of database management systems and more specifically to asynchronous protocols for interconnecting nodes of a clustered database management system.

BACKGROUND

Two factors in the usefulness of a clustered database management system (DBMS) are scalability and availability characteristics. One of the key sub-systems involved in defining these characteristics is the communications architecture for the cluster, particularly communications between nodes comprising the cluster.

A typical clustered DBMS may employ a pair of dedicated processes for performing inter-node requests. A single communications socket stream is established between the processes for communications. Requests between the nodes are routed across communications node boundaries via dedicated daemons. Clustered DBMS configurations which utilize a single communications socket stream may become a bottleneck at high data volumes.

In a clustered DBMS configuration utilizing multiple communications socket streams, when a failure of one of the nodes in the cluster occurs, the timing of when the communications links detect the failure and the order in which the failure is detected is not defined. However, the first link failure indicates that the node is gone, and thus it is desirable to ensure that once the node has restarted requests from the failed node on any link are no longer processed, unless a response is sent to a node that has no knowledge of the original request in the first place. This requires not allowing any connections to be reestablished with the failed node until confirmation has been received that each receiver has purged their links and any requests received from the failed node. Furthermore, if there is any notion of session state associated with requests in progress, sufficient time must be allowed for the session state to be cleaned before communications can be reestablished or collisions between the new requests and the old state may result. The required processing to recover communications between nodes can be time consuming and result in slow recovery time for the clustered DBMS. From an availability standpoint, this recovery and failover configuration is slow at best.

Therefore, there is a continuing need for providing systems and methods for asynchronous interconnect protocols for clustered database management systems, which can facilitate, for example, improved cluster scalability and increased node recovery processing for high-availability configurations.

SUMMARY OF THE INVENTION

An asynchronous interconnect protocol for a clustered database management system (DBMS) is provided to allow better cluster scalability and to implement increased node recovery processing for high-availability configurations. A communications architecture is presented that allows for parallel communications between nodes to occur reliably and asynchronously.

For scalability purposes parallel communications processes on each node of the cluster are utilized, each with their own socket stream to reduce the bottlenecking of the communications system and to allow more data volume to be pushed onto the network where needed. Additionally, dedicated sender and receiver processes are provided so that send and receive messaging can be processed in parallel to increase failure recovery speed and hence provide increased availability. The usage of node sessions and versioning allow for asynchronous behavior in the protocol architecture, allowing for maximum speed of recovery. New requests may be processed as soon as the failed node is restarted and any cleanup needed from existing requests can be processed asynchronously.

Certain exemplary embodiment can provide a clustered database management system (DBMS) operatively coupled to a data processing system having memory for storing a database, a method for asynchronous interconnection between a first and a second node of the clustered database management system, the method comprising the steps of a) associating a first node timestamp for the first node and a second node timestamp for the second node when the nodes are started; b) establishing a connection between the first node and second node by two or more communication conduits each having an associated session identifier; c) associating, for the first node, the session identifiers with the second node timestamp; d) receiving, at the first node, a timestamp from second node; e) comparing the received second node timestamp to the second node timestamp associated with session identifiers; and f) initiating communications between the first and second nodes via the communication conduits.

Certain exemplary embodiment can provide a medium containing computer executable code for asynchronous interconnection between a first and a second node of the clustered database management system, the computer programmed product comprising code for associating a first node timestamp for the first node and a second node timestamp for the second node when the nodes are started; code for establishing a connection between the first node and second node by two or more communication conduits each having an associated session identifier; code for associating, for the first node, the session identifiers with the second node timestamp; code for receiving, at the first node, a timestamp from second node; code for comparing the received second node timestamp to the second node timestamp associated with session identifiers; and code for initiating communications between the first and second nodes via the communication conduits.

Certain exemplary embodiment can provide a clustered database management system (DBMS) operatively coupled to a data processing system, a system for asynchronous interconnection between a first and a second node of the clustered database management system, the system comprising a module for associating a first node timestamp for the first node and a second node timestamp for the second node when the nodes are started; a module for establishing a connection between the first node and second node by two or more communication conduits each having an associated session identifier; a module for associating, for the first node, the session identifiers with the second node timestamp; a module for receiving, at the first node, a timestamp from second node; a module for comparing the received second node timestamp to the second node timestamp associated with session identifiers; and a module for initiating communications between the first and second nodes via the communication conduits.

Other aspects and features of the present invention will become apparent to those ordinarily skilled in the art or science to which it pertains upon review of the following description in conjunction with the accompanying figures.

BRIEF DESCRIPTION OF DRAWINGS

A better understanding of these and other embodiments can be obtained with reference to the following drawings and detailed description of the exemplary embodiments, in which:

FIGS. 7A & 7B is a flowchart of a connect module;

DETAILED DESCRIPTION OF THE INVENTION

Figure 1:
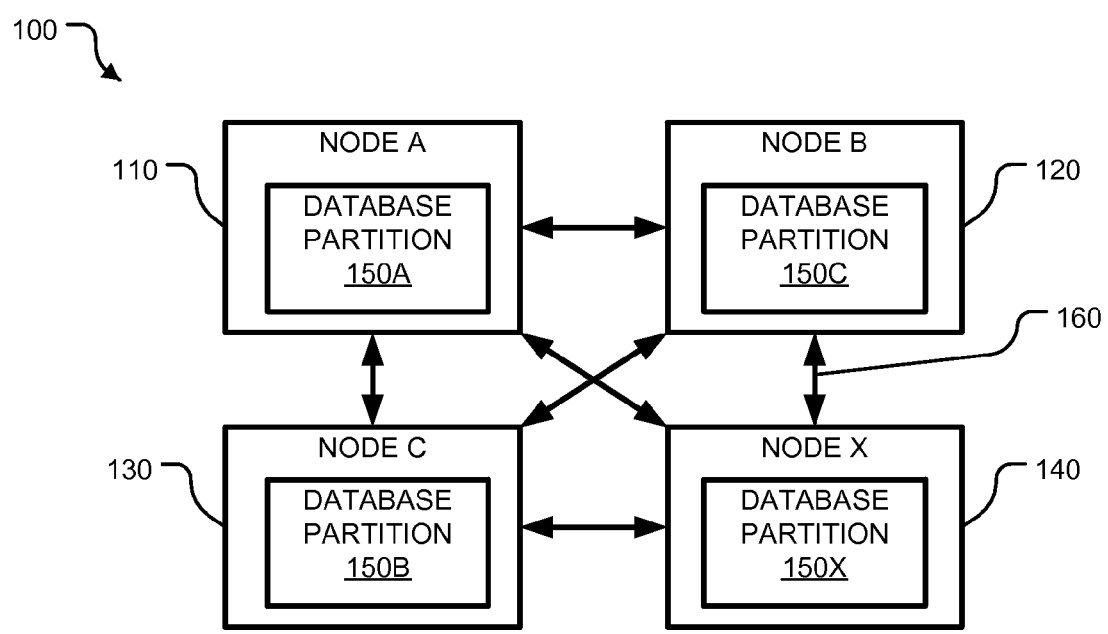
FIG. 1 is a schematic representation of communications between nodes of a clustered DBMS.

FIG. 1 is a schematic representation of a clustered database management system (DBMS) 100. The clustered DBMS 100 spans multiple nodes A, B, C to X (110, 120, 130 and 140). The nodes (110, 120, 130 and 140) may be hosted on individual servers or multiple logical nodes may exist on a single server. Each node (110, 120, 130 to 140) contains a partition of the database (150A, 150B, 150C to 150X respectively). Inter-node communication occurs by communication conduits such as data links or sockets 160. Each node (110, 120, 130 and 140) of the clustered database system 100 maintains a link 160 between each other node in the cluster. For example, Node A 110, maintains individual links with Node B 120, Node C 130 and every node in the cluster to Node X 140. Communications between nodes of the cluster facilitates coordination of database transactions such as database queries and updates. When a node fails or communication is lost between nodes, transactions or requests may be lost. Coordinating transactions between nodes is required to re-establish communications between nodes and recover the cluster. The time between communication failure and the recovery of communication is a significant aspect on the performance of the database in servicing queries.

Figure 2:
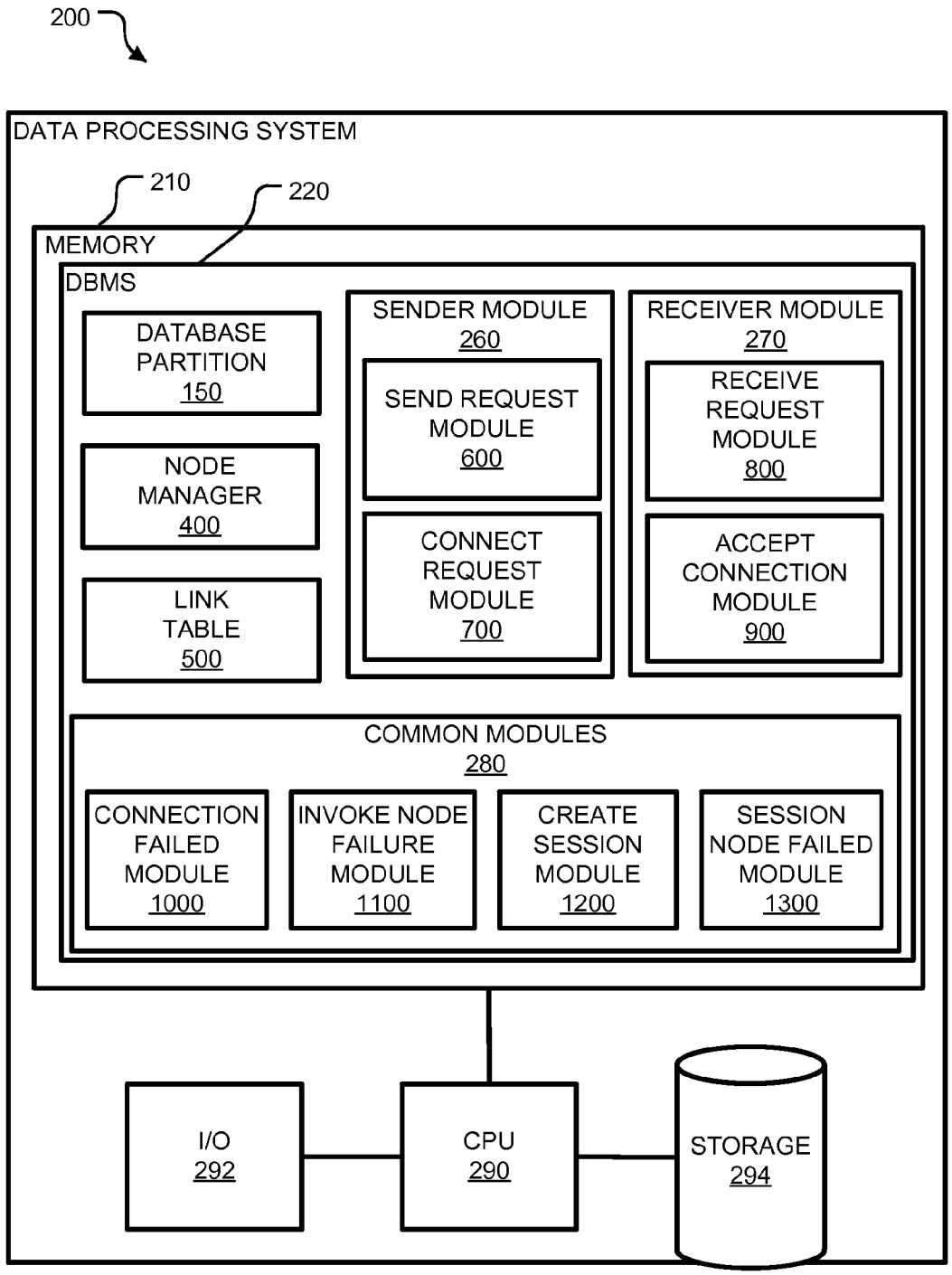
FIG. 2 is a schematic representation of a data processing system for implementing an exemplary embodiment of an asynchronous interconnect protocol for a clustered DBMS.

FIG. 2 shows an exemplary embodiment of a data processing system 200 for implementing an asynchronous interconnect protocol for a clustered DBMS. The asynchronous interconnect protocol for a clustered DBMS includes computer executable code, which is tangibly embodied in memory 210 of the data processing system 200. The computer executable code may comprise a database management system (DBMS) 220, which comprises database partitions 150, node manager 400, link table 500. In addition, a sender module 260 and receiver module 270 are provided, which are processes or daemons which operate on the data processing system 200 for each of the communications conduits between nodes. The sender module 260 has a send request module 600 and connect request module 700. The receiver module 270 has a receive request module 800 and accept connection module 900. A common module 280 has connection failed module 1000, invoke node failure module 1100, create session module 1200 and session node failed module 1300. The computer executable instructions for some of the modules are generally previously compiled by a code compiler from high level computer programmed instructions written in a high level computer programming language. The hardware elements of the data processing system 200 support and execute the computer executable code. The data processing system 200 includes a central processing unit (CPU) 290 that provides main processing functionality. The memory 210 is coupled to CPU 290 for providing operational storage of programs and data.

Memory 210 may comprise, for example, random access memory (RAM) or read only memory (ROM). Non-volatile storage of, for example, data files and programs is provided by storage 294 that may comprise, for example, disk storage. Both memory 210 and storage 294 comprise a computer useable medium that may store computer program products in the form of computer readable program code. User input and output is provided by an input/output (I/O) facility 292. The I/O facility 292 may include, for example, a graphical display, a mouse and/or a keyboard.

All memory modules or objects are assumed to be allocated in memory that can be accessed by all threads running in the system, either by using shared memory in a process based architecture, or by using shared or private memory in a threaded architecture. The individual memory objects presented have a distinct incarnation for each node of the cluster and the memory need not be shared across multiple nodes in the cluster.

Figure 3:
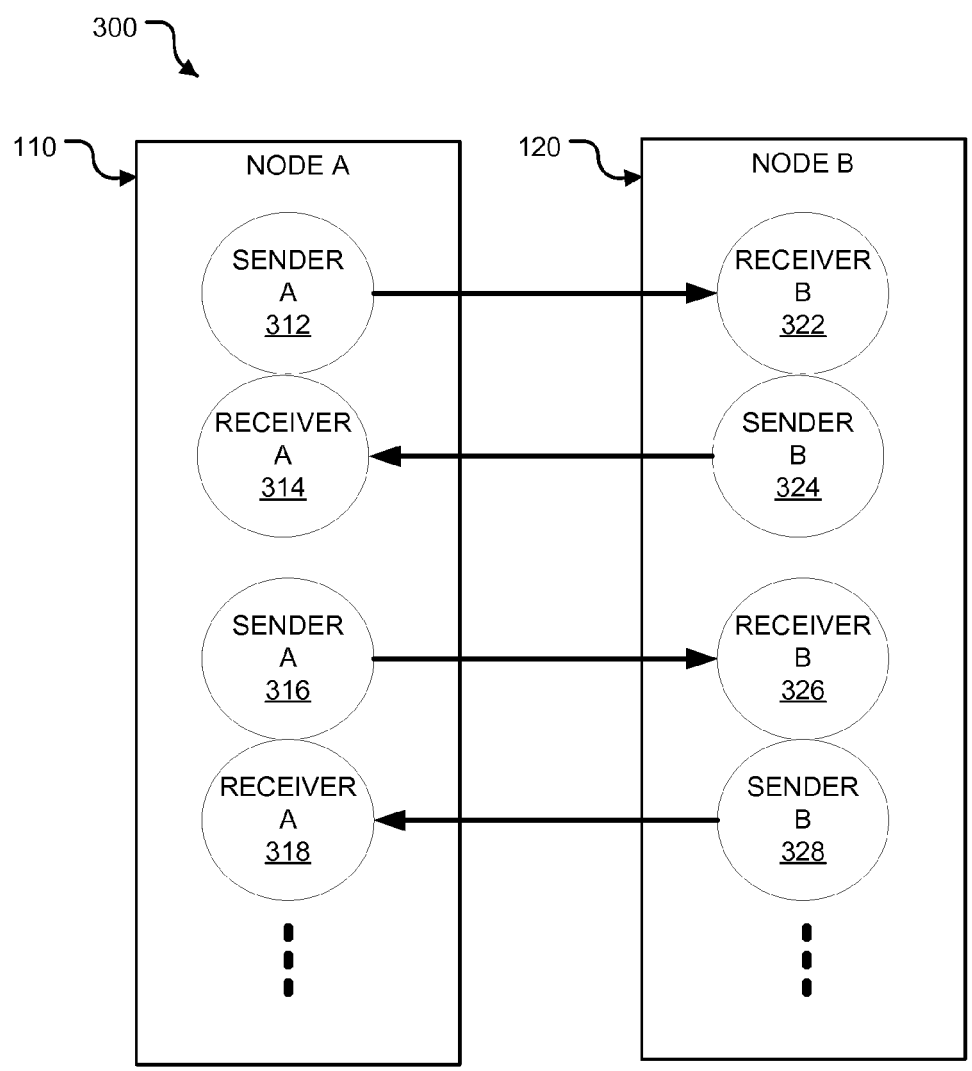
FIG. 3 is an exemplary representation of inter-node communication between nodes of a clustered DBMS.

FIG. 3 shows a diagrammatic representation of communication links between nodes (110, 120) of a clustered database 300. A communications conduit between nodes consists of a pair of separate sender and receiver processes on each node of the cluster. For example, on Node A 110, Sender A 312 and Receiver A 314 pair and Sender A 316 and Receiver A 318 pair provide communication links with Node B 120, via Receiver B 322 and Sender B 324 pair and Receiver B 326 and Sender B 328 pair respectively. Each sender and receiver process of a node connects by a communication link to a corresponding receiver and sender process of a corresponding node, such as Sender A 312 connects to Receiver B 322 and Sender B 324 connects to Receiver A 314. The sender and receiver processes for a given conduit on each node will connect asynchronously as needed using a stream based connection protocol such as TCP/IP. An arbitrary number of communications conduits allow for parallelism and hence better scalability in our cluster. Receive processes include a well-known listen socket as required by the sockets protocol. A user may explicitly specify a fixed number of connection pairs required between nodes allowing multiple sender and receiver processes to exist between nodes.

Asynchronous handling of connections is provided by enumerating individual communications sessions, and then coordinating them via global sessions in a global node manager 400. Users are then free to activate and use communications as needed. The session identifier's provide built in versioning that facilitate determining when a request is to be honored, or is stale and can be discarded.

Figure 4:
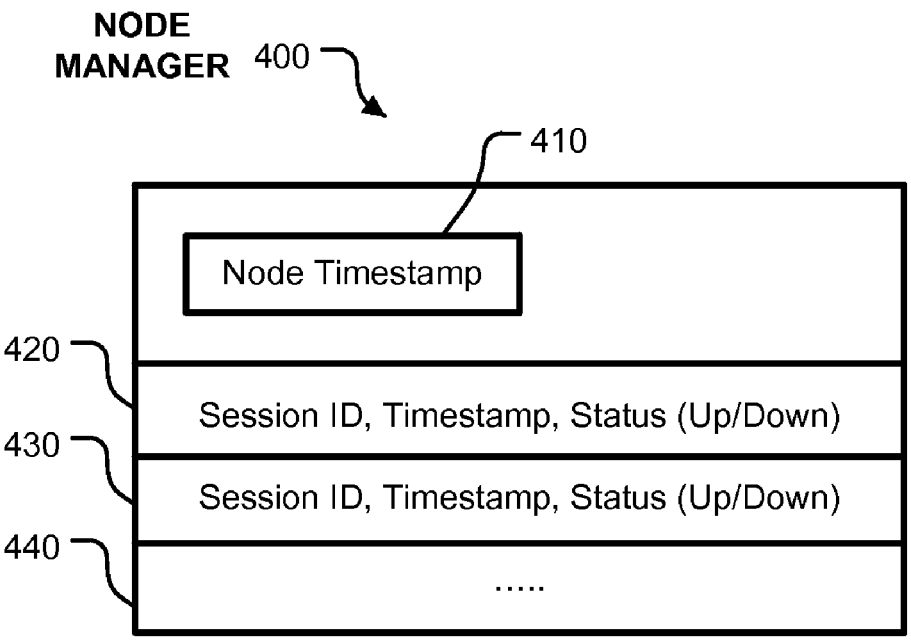
FIG. 4 is a schematic representation of a node manager.

FIG. 4 shows an exemplary embodiment of a node manager 400 object. The node manager 400 contains global information about the connections between nodes in the cluster. The node timestamp 410 for each node in the clustered DBMS is stored when the individual nodes are first started. Associated with each node timestamp are individual entries (420, 430 to 440) for identifying connections between nodes. The entries comprise a session identifier (session id) as well as the remote node timestamp (Timestamp) for each link to a remote node. Finally a status flag (Status) is identified as up or down to indicate whether or not there is a connection with the remote node. The individual entries (420, 430 and 440) comprise the node manager table of the node manager 400.

Figure 5:
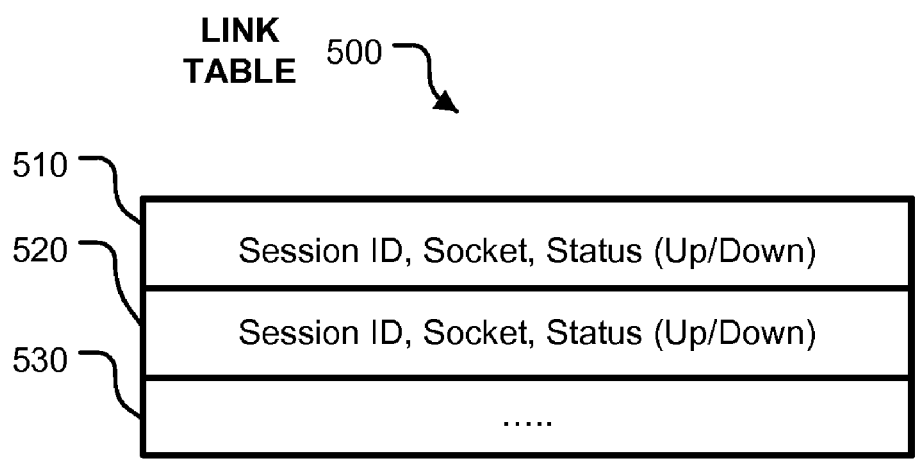
FIG. 5 is a schematic representation of a link table.

FIG. 5 shows an exemplary embodiment of a link table 500 object. The link table 500, of which there are one each per communications process, contains information about the socket streams (or other communications medium) used by each process for communications. The link table 500 identifies connections established with a node that have failed, so that in the case where one process first detects failure of a node, the other conduits can determine that their links are stale and reset them. The link table 500 in each process keeps a record of the session id associated with that particular connection. When performing sends or receives, it is first verified that the session id matches that of the global node manager 400. In the case where it does not, the link is stale which means it can be dropped and reconnected accordingly. Multiple table entries (501, 520 and 530) individually correspond to a link or conduit to a node in the cluster and include a session id (session id), as well as any other control information pertaining to identifying the socket (Socket) to the remote node. A status flag (Status) identifies if the particular session to the remote node is up or down.

The asynchronous interconnect protocol ensures that no requests buffered from a failed node will be processed once the first connection is initiated to the recovered incarnation of that node. This is required to ensure no unexpected replies are processed on a given node that has been restarted by identifying the state associated with requests from the failed incarnation of a node in the cluster. The session id for the link where the request from the failed node is buffered will not match a global session id for that node in the node manager 400. Stale links are detected and closed ensuring no collisions between states for new requests from a restarted node and states from the old incarnation of the node before it failed. Identification of connections established with a node that has failed is also provided so that where one communication conduit first detects failure of a node, the other communication conduits can determine that their links are stale and reset them. In the case where the request has already been processed, and a reply is being sent, the session id is preserved on which the request was received and it is compared to when sending the reply. In the case where it does not match, the reply is destined for a node that failed, and it is discarded. By differentiating incoming connect requests to determine whether a connection is being processed from the failed incarnation of a node versus the restarted node, it is possible determine whether a given connection is stale and should be cleaned up.

Figure 6:
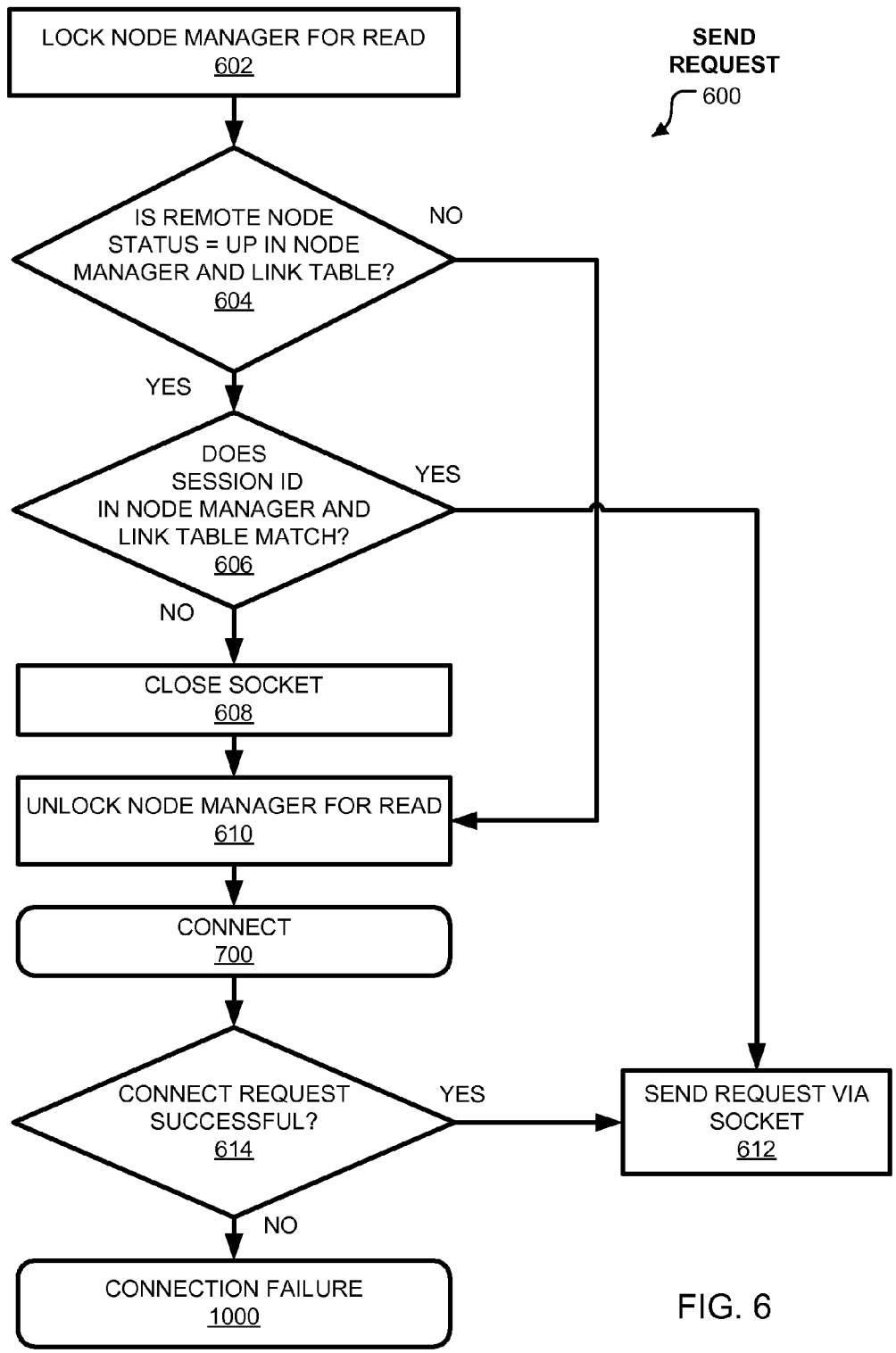
FIG. 6 is a flowchart of a send request module.

FIG. 6 is a flowchart of an exemplary embodiment of the send request module 600 associated with the sender module 260 as defined by, for example, processes of Senders A 312 and 316 and Senders B 324 and 328 to send a connect request between nodes (110, 120). The node manager 400 is locked for performing a read at step 602. Locking occurs in shared mode to ensure that the connection pairs do not get serialized during send operations. Since they lock in shared mode, two senders can get the lock at the same time and proceed to send independently from each other where they would otherwise have to go one after the other if only exclusive locking was utilized. At step 604, it is determined if the remote node status is 'up' in the node manger 400 and link table 500. If the status is 'up', YES at 604, it is then determined whether the session id's in the node manager 400 and link table 500 match at step 606. If the status is set to 'down', NO at step 604, the node manager 400 is unlocked for read at step 610.

If the session id's in the node manager 400 and the link table 500 do not match, NO at step 606, the socket is closed at step 608. At step 610 the node manager 400 is unlocked for read. A connect request is then sent as per connect module 700. If the connect is successful, YES at step 614, a send request is sent via the identified socket at step 612. If the connect is not successful, NO at step 614, the connection failure module 1000 is invoked. If at step 606 the session id's in the node manager 400 and link table 500 match, YES at 606, the send request is sent via the identified socket at step 612.

Exemplary computer code of an implementation of the send request module 600 is shown below.

```
SEND_REQUEST (NODE_NUMBER)
// Variations may include an asynchronous connect, where
// the data flow is only initiated once status of the
// connect is determined
// We assume the caller will select
// the daemon to do the send via some well known
algorithm
// (round robin for example), and the request is then
// passed to the daemon which invokes SEND_REQUEST to
// process it.
NODE_MANAGER[NODE_NUMBER].LOCK_FOR_READ( )
// Node is not up
IF (NODE_MANAGER[NODE_NUMBER].status != UP) OR
   (LINK_TABLE[NODE_NUMBER].status != UP) THEN
   NODE_MANAGER[NODE_NUMBER].UNLOCK_FOR_READ( )
   CONNECT(NODE_NUMBER)
// Node is up but link is stale
ELSE IF (LINK_TABLE[NODE_NUMBER].sessionId !=
      NODE_MANAGER[NODE_NUMBER].sessionId) THEN
   Close socket in LINK_TABLE[NODE_NUMBER]
   NODE_MANAGER[NODE_NUMBER].UNLOCK_FOR_READ( )
   CONNECT(NODE_NUMBER)
ENDIF
// Flow the request
IF (CONNECT SUCCEEDED)
   Send request via LINK_TABLE[NODE_NUMBER].socket
ENDIF
```

Figure 7B:
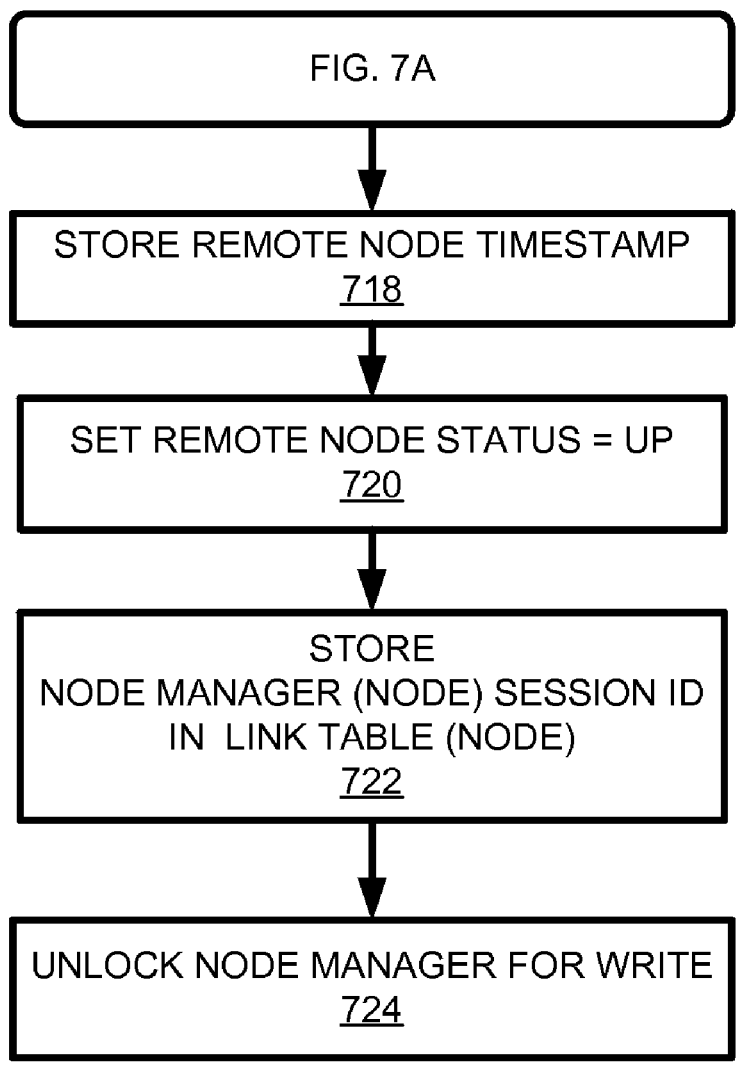

FIGS. 7A & 7B is a flowchart of an exemplary embodiment of the connect module 700 associated with the sender module 260 as defined by, for example, processes of Senders A 312 and 316 and Senders B 324 and 328 to initiate a connection to a remote node. Referring to FIG. 7A, the node manager 400 is locked to enable a write at step 702. A socket is created in the link table 500 to send a connection message to the remote node at step 704. A connect call is initiated on the created socket at step 706. If the connection is not successful, NO at step 708, the node failure module 1100 is invoked. If the connection is successful, YES at step 708, the node number is sent by the socket identified in the link table 500 at step 710. The node timestamp is then sent via the socket identified in the link table 500 at step 712. The remote node timestamp is then received via the socket at step 714. If the remote node status is set to 'up' and the timestamps do not match in the node manager 400, YES at step 716, the node failure module 1100 is invoked. If the remote node status is set to 'up' and the timestamps do match, NO at step 716, at step 718 of FIG. 7B, the remote node timestamp is stored in the node manager 400. The remote node status is set to 'up' in the remote node manager 400 at step 720. The session id used to initiate the connection in the node manager 400 is stored in the link table 500 at step 722. The node manager is then unlocked for write at step 724.

Exemplary computer code of an implementation of the connect module 700 is shown below.

```
CONNECT (NODE_NUMBER)
// Called by the send daemon to initiate a connection to
a
// remote node
NODE_MANAGER.LOCK_FOR_WRITE( )
Create socket in LINK_TABLE[NODE_NUMBER].Socket
Initiate connect call on socket
IF (Connect succeeded) THEN
      Send my node number via
LINK_TABLE[NODE_NUMBER].Socket
      Send node timestamp via
LINK_TABLE[NODE_NUMBER].Socket
         Receive remote node timestamp via
               LINK_TABLE[NODE_NUMBER].Socket
// If we are already connected to the target node in
// another daemon, a and the timestamp received does not
// match, this means the node went down
      IF ((NODE_MANAGER[NODE_NUMBER].status = UP) AND
         (NODE_MANAGER[NODE_NUMBER].timestamp
         != remote node timestamp)) THEN
         INVOKE_NODE_FAILURE(NODE_NUMBER)
      ENDIF
      Store remote node timestamp in
         NODE_MANAGER[NODE_NUMBER].timestamp
      Set NODE_MANAGER[NODE_NUMBER].status = UP
ENDIF
// Store the session ID we used to initiate the
connection
Set LINK_TABLE[NODE_NUMBER].sessionId =
      NODE_MANAGER[NODE_NUMBER].sessionId
      NODE_MANAGER.UNLOCK_FOR_WRITE( )
```

Figure 8:
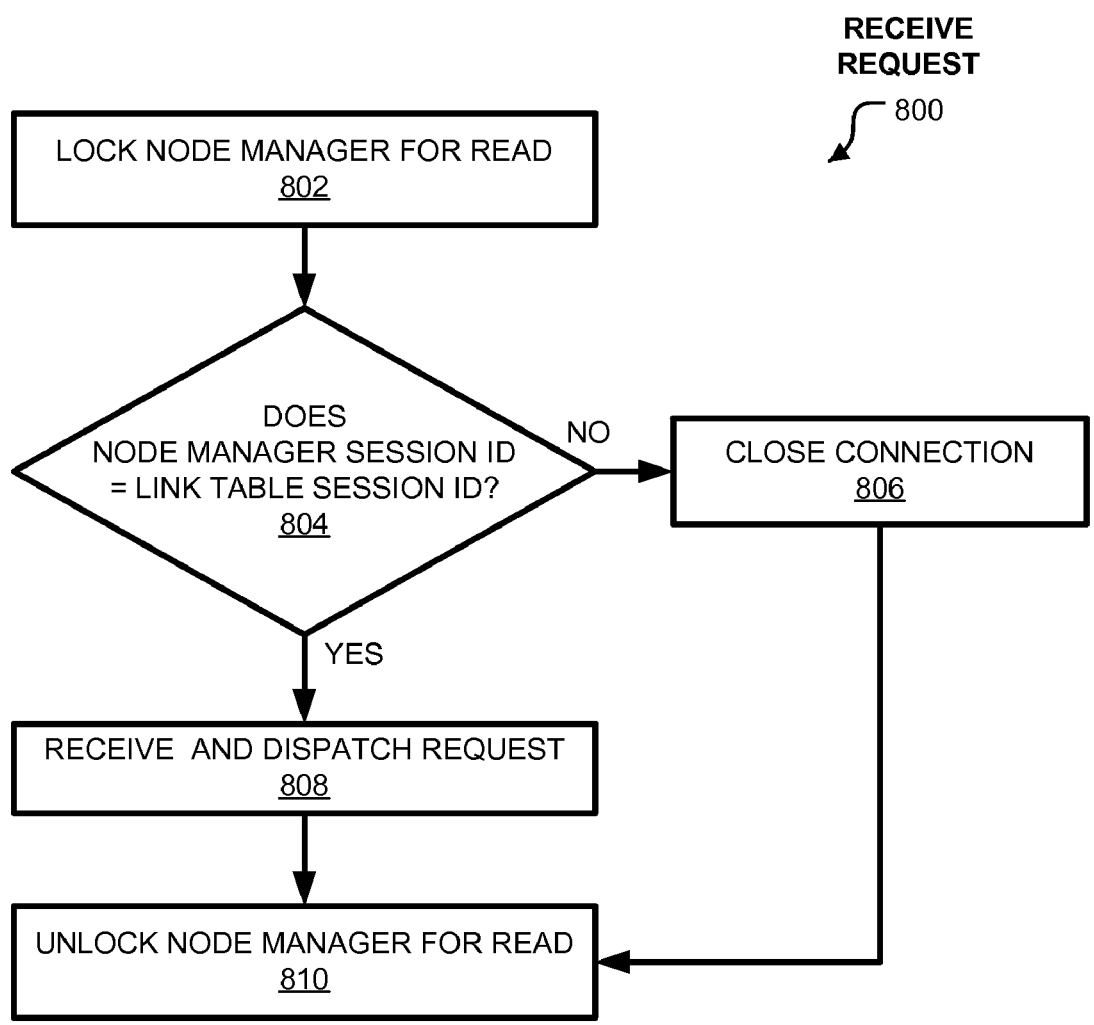
FIG. 8 is a flowchart of a receive request module.

FIG. 8 is a flowchart of an exemplary embodiment of the receive request module 800 associated with the receiver module 270 as defined by for example processes of Receivers A 314 and 318 and Receivers B 322 and 326. The receive request module 800 identifies the state associated with requests from the failed incarnation of a node in the DBMS cluster. This is required to ensure no collisions between state for new requests from a restarted node, and state from the old incarnation of the node before it failed. At step 802, the node manager 400 is locked for read. If the node manager 400 session id for the remote node is equal to the link table 500 session id, YES at step 804, the request is received from the remote node and dispatched at step 808. The node manger 400 is then unlocked for read at step 810. If the node manager 400 table session id for the remote node does not equal the link table 500 session id, NO at step 804, then the connection is closed at step 806 and the node manager 400 is unlocked for read at step 810.

Exemplary computer code of an implementation of the receive connection module 800 is shown below.

```
      RECEIVE_REQUEST(NODE_NUMBER)
      // Called to process a request detected on a connected
      link
      // in the receiver daemon
      NODE_MANAGER.LOCK_FOR_READ( )
      // Verify session ID before processing request
      IF (NODE_MANAGER[NODE_NUMBER].sessionId =
         LINK_TABLE[NODE_NUMBER].sessionId)
      THEN
         Receive and dispatch request
      ELSE
         Close connection
      ENDIF
      NODE_MANAGER.UNLOCK_FOR_READ( )
```

Figure 9A:
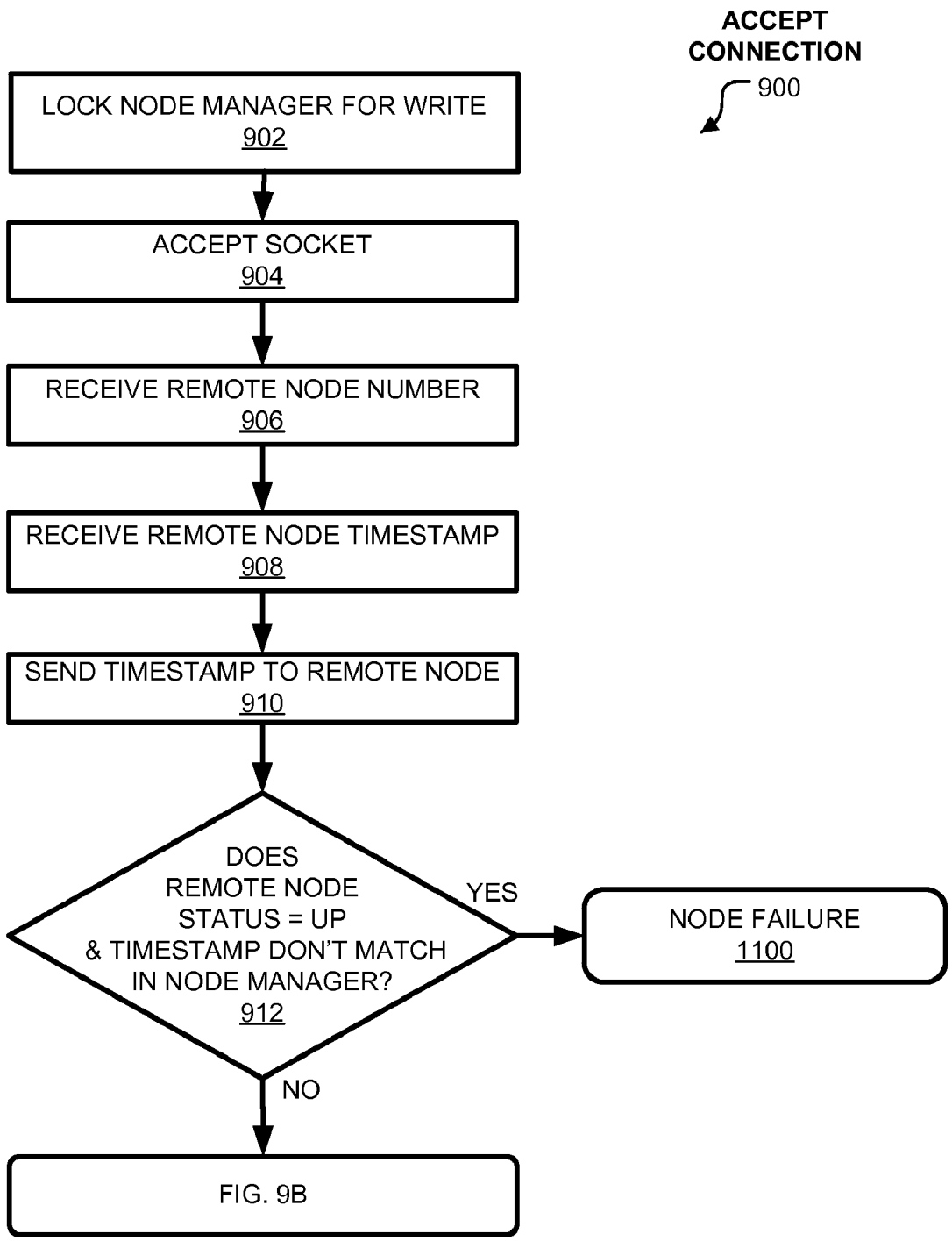
FIGS. 9A & 9B is a flowchart of an accept connection module.
Figure 9B:
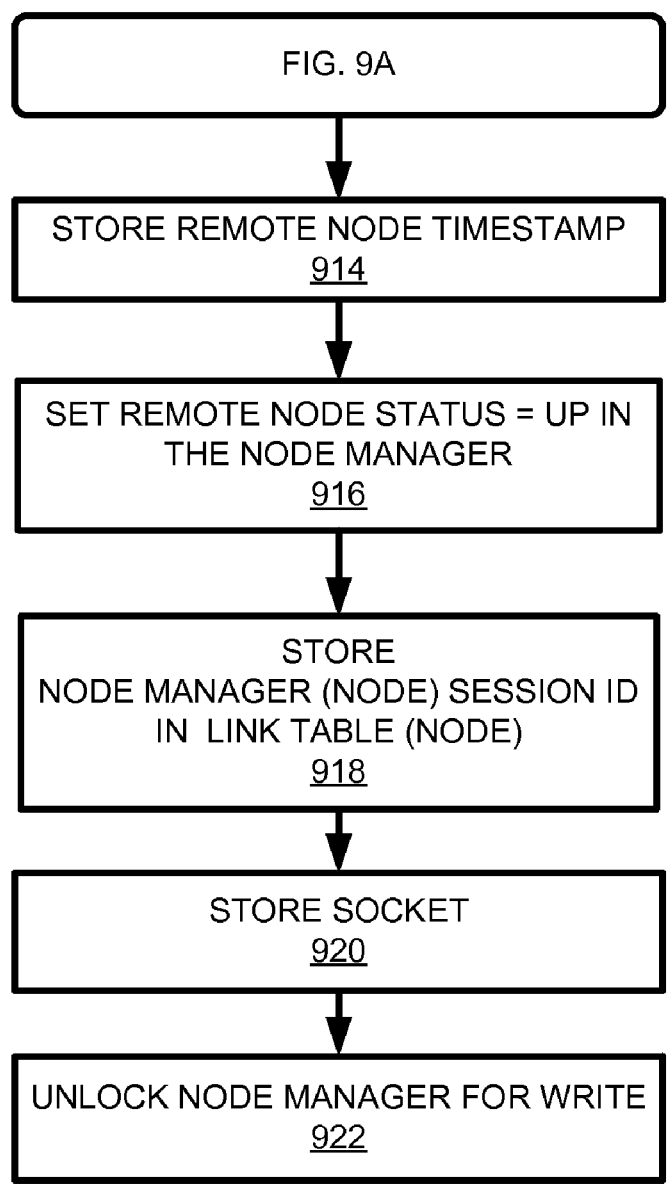

FIGS. 9A & 9B is a flowchart of an exemplary embodiment of the accept connection module 900 associated with the receiver module 270 as defined by for example processes of Receivers A 314 and 318 and Receivers B 322 and 326. The connection module 900 enables incoming connect requests to be differentiated to determine whether a connection is being processed from the failed incarnation of a node versus the restarted node. This is necessary to determine whether a given connection is stale and should be cleaned up. The iteration of a given node can effectively be enumerated when it starts up by the node timestamp. This versioning information is available whenever a new connection from a node is received, which can then be compared with the timestamp for that node stored in the case where there was a previous connection. In the case of a match, it is ensured that a connection has been made to the correct version of that node and the connection can proceed. In the case of a mismatch, the existing connection to that node is stale, and the recovery processing and be invoked accordingly. The node manager 400 is locked for write at step 902. The received socket is accepted at step 904. The remote number is then received via the socket at step 906 and the timestamp of the remote node is received at step 908. The node timestamp from the node manager 400 is then sent via the socket at step 910. If the remote node status is 'up' in the node manager 400 and the timestamp for the remote node does not match, YES at step 912, the node failure module 1100 is invoked. If the remote node status is 'up' and the timestamp for the remote node does match, NO at step 912, at step 914 of FIG. 9B, the remote node timestamp is stored in the node manager 400. The remote node status is then set to 'up' in the in the remote node manager at step 916. The node manager 400 session id is then stored in the link table 500 at step 918. The socket is then stored in the link table 500 at step 920. The node manager 400 is then unlocked for write at step 922.

Exemplary computer code of an implementation of the accept connection module 900 is shown below.

```
ACCEPT_CONN( )
// Called to accept an incoming connection detected on
the
// well-known listen socket
NODE_MANAGER.LOCK_FOR_WRITE( )
Accept socket
Receive remote NODE_NUMBER via socket
Receive remote TIMESTAMP via socket
Send NODE_TIMESTAMP via socket
// Verify the timestamp we received matches the timestamp
// recorded in the node manager if we were already
// connected to this node in another daemon
IF ((NODE_MANAGER[NODE_NUMBER].status = UP) AND
      (NODE_MANAGER[NODE_NUMBER].timestamp != received
      TIMESTAMP)) THEN
      INVOKE_NODE_FAILURE(NODE_NUMBER)
ENDIF
NODE_MANAGER[NODE_NUMBER].status = UP
Store remote node timestamp in
NODE_MANAGER[NODE_NUMBER].timestamp
Set LINK_TABLE[NODE_NUMBER].sessionId =
NODE_MANAGER[NODE_NUMBER].sessionId
Store socket in LINK_TABLE[NODE_NUMBER].socket
NODE_MANAGER.UNLOCK_FOR_WRITE( )
```

Figure 10:
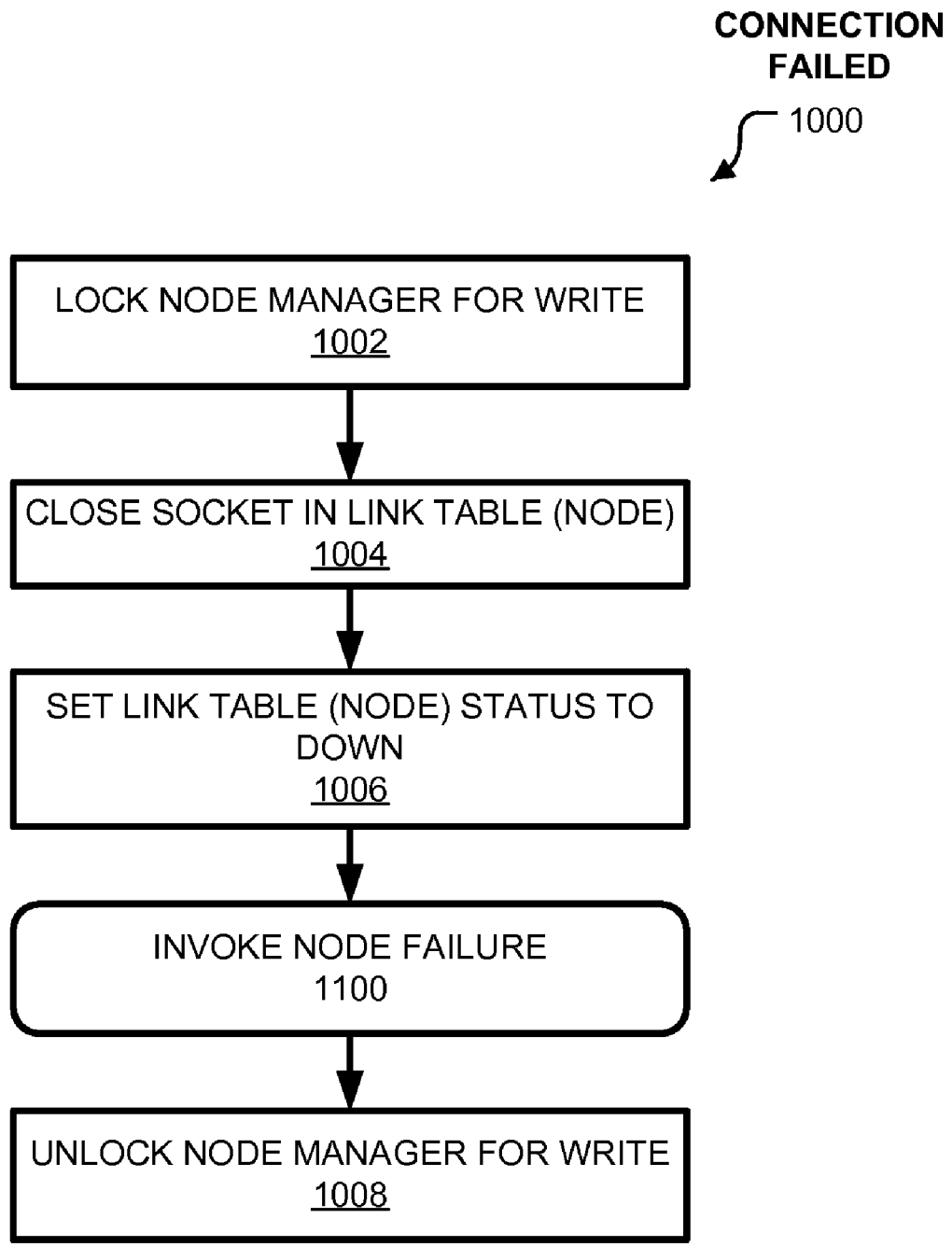
FIG. 10 is a flowchart of a connection failed module.

FIG. 10 is a flowchart of an exemplary embodiment of the connection failed module 1000. The connection failed module 1000 is called when a connection is dropped or reset event is detected on one of the links in a send or receive process. The node manger 400 is locked for write at step 1002. The socket identified in the link table 500 is closed at step 1004. The link table 500 status for the node is set to 'down' at step 1006. The invoke node failure module 1100 is then executed and the node manager 400 is then unlocked for write at step 1008.

Exemplary computer code of an implementation of the connection failed module 1000 is shown below.

```
CONNECTION_FAILED(NODE_NUMBER)
// Called when a connection dropped / reset event is
// detected on one of the links in a send or receive
daemon
NODE_MANAGER.LOCK_FOR_WRITE( )
Close LINK_TABLE[NODE_NUMBER].Socket
Set LINK_TABLE[NODE_NUMBER].Status = DOWN
INVOKE_NODE_FAILURE(NODE_NUMBER, TRUE)
NODE_MANAGER.UNLOCK_FOR_WRITE( )
```

Figure 11:
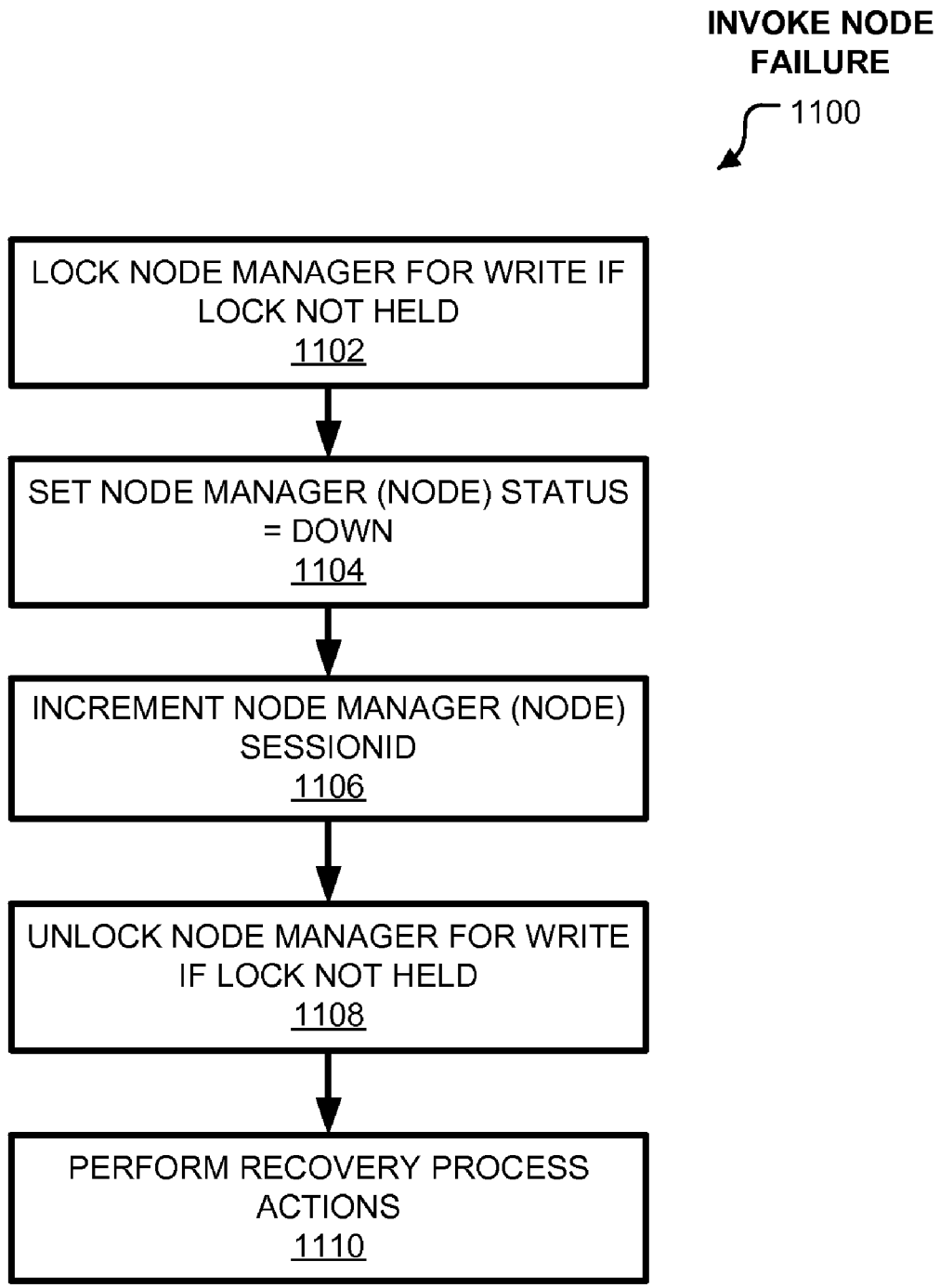
FIG. 11 is a flowchart of an invoke node failure module.

FIG. 11 is a flowchart of an exemplary embodiment of the invoke node failure module 1100. The node failure module 1100 registers a remote node failure when the remote node is not processing communications and is assumed failed. The node manager 400 is locked for write at step 1102 if the write lock had not been previously held. The node manager 400 status for the remote node is set equal to 'down' at step 1104. The node manager 400 session id for the remote node is incremented at step 1106. The node manager 400 is unlocked for write at step 1108 if the lock is not held. At step 1110, any recovery processing actions required to clean up the states is performed.

Exemplary computer code of an implementation of the invoke node failure module 1100 is shown below.

```
INVOKE_NODE_FAILURE(NODE_NUMBER, LOCK_HELD)
// Called to register a node failure in the global node
// manager
IF NOT LOCK_HELD THEN
NODE_MANAGER.LOCK_FOR_WRITE( )
SET NODE_MANAGER[NODE_NUMBER].Status = DOWN
Increment NODE_MANAGER[NODE_NUMBER].SessionId
IF NOT LOCK_HELD THEN
NODE_MANAGER.UNLOCK_FOR_WRITE( )
Perform any recovery processing actions required to clean
up state
```

Figure 12:
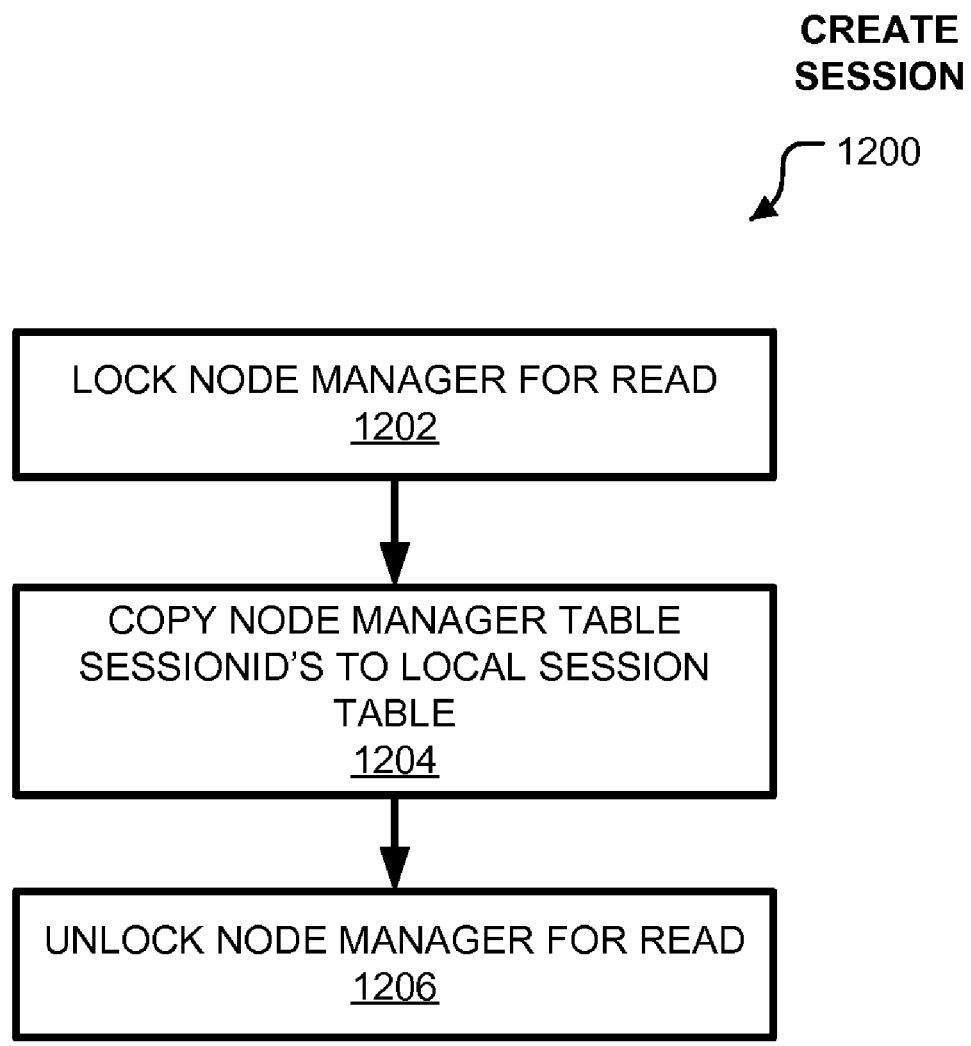
FIG. 12 is a flowchart of a create session module.

FIG. 12 is a flowchart of an exemplary embodiment of the create session module 1200. The create session module 1200 creates a copy of the node manager 400 table entries to identify whether the session is invalidated by a node failure. The node manager 400 is locked for read at step 1202. A copy of the node manager 400 table entries (420, 430 and 440) session id's for the remote nodes is copied to a local copy at step 1204. The node manager 400 is then unlocked for read at step 1206.

Exemplary computer code of an implementation of the connection session module 1200 is shown below.

```
CREATE_SESSION(LOCAL_SESSION)
// Called to tag local session state with data needed to
// identify whether the session is invalidated by a node
// failure
NODE_MANAGER.LOCK_FOR_READ( )
COPY NODE_TABLE[ ].sessionId's to local session
NODE_MANAGER.UNLOCK_FOR_READ( )
```

Figure 13:
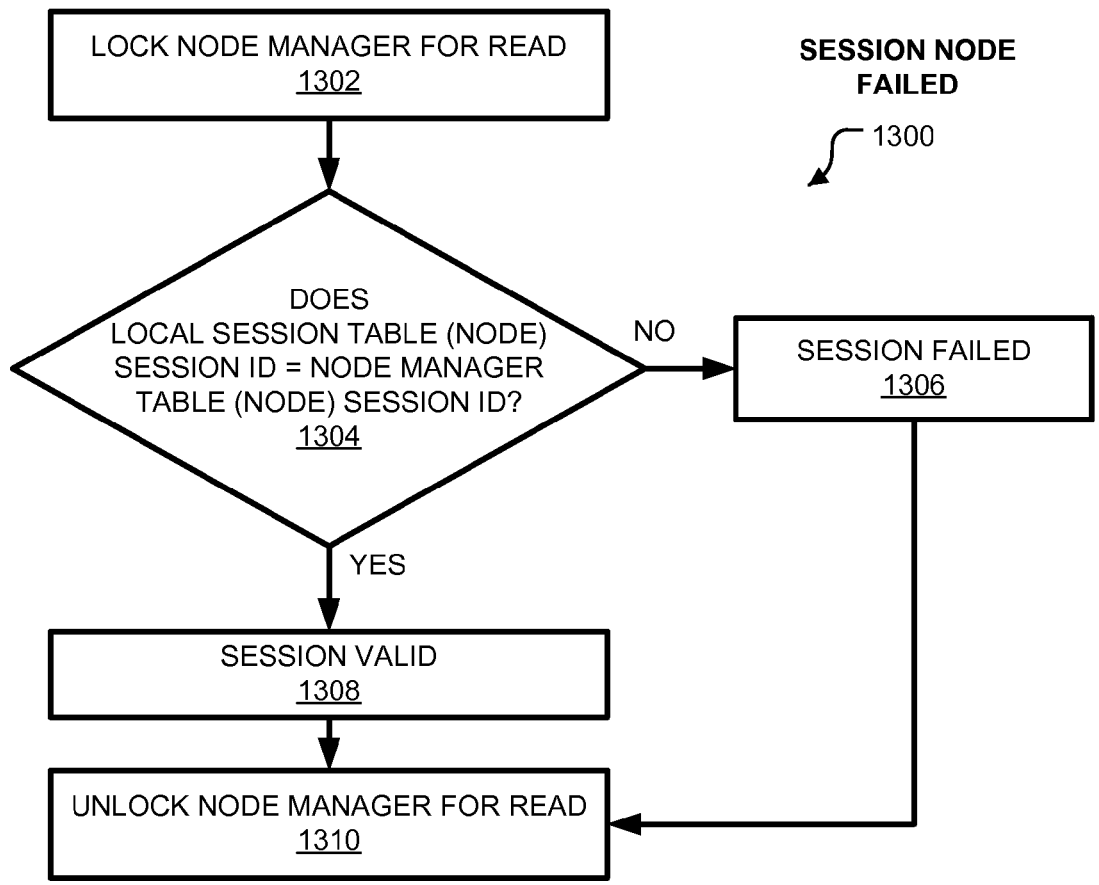
FIG. 13 is a flowchart of a session node failed module.

FIG. 13 is a flowchart of an exemplary embodiment of the session node failed module 1300 to query whether local session state is still valid or has been invalidated by a node failure. The node manager 400 is locked for read at step 1302. If the local session table session id which was created in create session module 1200 equals session id in the node manager 400, YES at step 1304, then the session is valid at step 1308. The node manager 400 is then locked for read at step 1310. If the session id's in the local session table do not equal the node manager session id, NO at step 1304, then the session failed at step 1306. The node manger is unlocked for read at step 1310.

Exemplary computer code of an implementation of the session node failed module 1300 is shown below.

```
SESSION_NODE_FAILED(NODE_NUMBER)
// Called to query whether local session state is still
// valid, or has been invalidated by a node failure
NODE_MANAGER.LOCK_FOR_READ( )
IF (LOCAL_SESSION.NODE_TABLE[NODE_NUMBER].sessionId !=
    NODE_MANAGER.NODE_TABLE[NODE_NUMBER].sessionId)
    THEN
    Result = TRUE
ELSE
    Result = FALSE
ENDIF
NODE_MANAGER.UNLOCK_FOR_READ( )
```

The invention can take the form of an entirely hardware embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, or store the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) Can be coupled to the system either directly or through intervening I/O controllers.

Network adapters may also be coupled to the system to enable the data processing system to become coupled to other data processing systems or remote printers or storage devices through intervening private or public networks. Modems, cable modem and ethernet cards are just a few of the currently available types of network adapters.

It will be apparent to one skilled in the art that numerous modifications and departures from the specific embodiments described herein may be made without departing from the spirit and scope of the present invention.

What is claimed is:

1. For a clustered database management system (DBMS) operatively coupled to a data processing system having memory for storing a database, a method for asynchronous interconnection between a first and a second node of the clustered database management system, the first and the second node each having a processor and a memory, the method comprising the steps of:
   a) associating a first node timestamp with the first node when the first node is started and a second node timestamp with the second node when the second node is started;
   b) establishing a connection between the first node and second node by two or more communication conduits, wherein the two or more communication conduits each have an associated session identifier;
   c) associating the session identifiers with the first node timestamp and the second node timestamp;
   d) receiving, at the first node, another timestamp from the second node;
   e) comparing the received another timestamp from the second node to the second node timestamp associated with the session identifiers; and
   f) initiating, in response to the comparing, communications between the first and second nodes via the communication conduits.

2. The method of claim 1, wherein step f) further comprises commencing communication between the first node and second node when the received another timestamp matches the second node timestamp associated with one of the session identifiers.

3. The method of claim 1, wherein step b) further comprises associating respective status identifiers of the communication conduits with the respective session identifiers, wherein the status identifiers are defined as either up or down for each respective session identifier.

4. The method of claim 3, wherein step b) further comprises associating a communications socket identifier with one of the session identifiers when one of the communication conduits is established.

5. The method of claim 4, further comprising:
   for each node, storing in a global node manager object a node timestamp and associated session identifiers, received timestamps from other nodes to which the node is connected in sessions corresponding to associated session identifiers, and status identifiers for identifying a status of each of the communication conduits associated with the session identifiers of the respective node; and
   storing in a link table object, for each communication conduit, a session identifier, a socket identifier, and a status identifier of each of the communication conduits.

6. The method of claim 5, wherein step b) further comprises setting the status identifier of a communication conduit to up in the node manager object and the link table object when the connection is established.

7. The method of claim 6, further comprising setting the status identifier of the communications conduit which is associated with the session identifier of the communication conduit to down in the link table object when a drop or reset event is detected.

8. The method of claim 7, further comprising prior to step f) the steps of:

determining if the status identifier associated with the session identifier in the node manager object for the second node is equal to a value indicating that the communication conduit corresponding to the associated session identifier is up;

determining, if it is determined that the status identifier is up, if a session identifier of the communication conduit in the node manager object and a session identifier of the communication conduit in the link table object match; and establishing a communication socket to initiate a connect call to the second node on the associated communication conduit when the status identifier is equal to up and the session identifiers of the communication conduit match.

9. The method of claim 8, further comprising storing a socket identifier for the established communication socket in the link table object of the communication conduit.

10. The method of claim 5, further comprising subsequent to step f) the steps of:
    determining that the second node has failed;
    setting the status identifier of the communication conduit associated with the second node to a value indicating that the communication conduit is down in the node manager object when communication between the first node and second node is not established due to the failed second node;
    closing the communication conduits to the second node; and
    incrementing the session identifiers associated with the closed communication conduits in the global node manager object.

11. The method of claim 1, wherein communication between the first node and the second node facilitates coordination of database transactions, wherein the database transactions comprise database queries and database updates.

12. For a clustered database management system (DBMS) operatively coupled to a data processing system, a computer programmed product comprising a non-transitory computer readable storage medium containing computer executable code for asynchronous interconnection between a first and a second node of the clustered database management system, the computer executable code on the computer programmed product comprising:

associating a first node timestamp with the first node when the first node is started and a second node timestamp with the second node when the second node is started;

establishing a connection between the first node and second node by two or more communication conduits, wherein the two or more communication conduits each have an associated session identifier;

associating the session identifiers with the first node timestamp and the second node timestamp;

receiving, at the first node, another timestamp from the second node;

comparing the received another timestamp from the second node to the second node timestamp associated with the session identifiers; and initiating, in response to the comparing, communications between the first and second nodes via the communication conduits.

13. The computer programmed product of claim 12, wherein the initiating communications between the first and second nodes further comprises commencing communication between the first node and second node when the received another timestamp matches the second node timestamp associated with one of the session identifiers.

14. The computer programmed product of claim 12, wherein the establishing a connection between the first node and second node further comprises associating a communications socket identifier with one of the session identifiers when one of the communication conduits is established.

15. The computer programmed product of claim 14, wherein the computer executable code further comprises
for each node, storing in a global node manager object a node timestamp and session identifiers, received timestamps from other nodes to which the node is connected in sessions corresponding to associated session identifiers, and status identifiers for identifying a status of each of the communication conduits associated with the session identifiers of the respective node; and
storing in a link table object, for each communication conduit, a session identifier, a socket identifier, and a status identifier of each of the communication conduits.

16. The computer programmed product of claim 15, wherein the computer executable code further comprises
determining if the status identifier associated with the session identifier in the node manager object for the second node is equal to a value indicating that the communication conduit corresponding to the associated session identifier is up;
determining, if it is determined that the status identifier is up, if a session identifier of the communication conduit in the node manager object and a session identifier of the communication conduit in the link table object match; and
establishing a communication socket to initiate a connect call to the second node on the associated communication conduit when the status identifier is equal to up and the session identifiers of the communication conduit match.

17. The computer programmed product of claim 15, wherein the computer executable code further comprises
determining that the second node has failed;
setting the status identifier of the communication conduit associated with the second node to a value indicating that the communication conduit is down in the node manager object when communication between the first node and second node is not established due to the failed second node;
closing the communication conduits to the second node; and
incrementing the session identifiers associated with the closed communication conduits in the global node manager object.

18. The computer programmed product of claim 12, wherein communication between the first node and the second node facilitates coordination of database transactions, wherein the database transactions comprise database queries and database updates.

19. For a clustered database management system (DBMS) operatively coupled to a data processing system, a system for asynchronous interconnection between a first and a second node of the clustered database management system, the system comprising:
a module, executed on a processor, for associating a first node timestamp with the first node when the first node is started and a second node timestamp with the second node when the second node is started;
a module for establishing a connection between the first node and second node by two or more communication conduits, wherein the two or more communication conduits each have an associated session identifier;
a module for associating the session identifiers with the first node timestamp and the second node timestamp;
a module for receiving, at the first node, another timestamp from the second node;
a module for comparing the received another timestamp from the second node to the second node timestamp associated with the session identifiers; and
a module for initiating, in response to the comparing, communications between the first and second nodes via the communication conduits.

20. The system of claim 19, wherein the module for initiating communications between the first and another further comprises commencing communication between the first node and second node when the received second node timestamp matches the second node timestamp associated with one of the session identifiers.

21. The system of claim 20, wherein the module for establishing a connection between the first node and second node further comprises associating a communications socket identifier with one of the session identifiers when one of the communication conduits is established.

22. The system of claim 21, further comprising:
a module for storing, for each node, in a global node manager object a node timestamp and session identifiers, received timestamps from other nodes to which the node is connected in sessions corresponding to associated session identifiers, and status identifiers for identifying a status of each of the communication conduits associated with the session identifiers of the respective node; and
a module for storing in a link table object, for each communication conduit, a session identifier, a socket identifier, and a status identifier of each of the communication conduits.

23. The system of claim 22, further comprising a module for:
determining if the status identifier associated with the session identifier in the node manager object for the second node is equal to a value indicating that the communication conduit corresponding to the associated session identifier is up;
determining, if it is determined that the status identifier is up, if a session identifier of the communication conduit in the node manager object and a session identifier of the communication conduit in the link table object match; and
establishing a communication socket to initiate a connect call to the second node on the associated communication conduit when the status identifier is equal to up and the session identifiers of the communication conduit match.

24. The system of claim 23, further comprising a module for:
determining that the second node has failed;
setting the status identifier of the communication conduit associated with the second node to a value indicating that the communication conduit is down in the node manager object when communication between the first node and second node is not established due to the failed second node;
closing the communication conduits to the second node; and
incrementing the session identifiers associated with the closed communication conduits in the global node manager object.

25. The system of claim 19, wherein communication between the first node and the second node facilitates coordination of database transactions, wherein the database transactions comprise database queries and database updates.

* * * * *